(12) United States Patent
Huang et al.

(10) Patent No.: US 6,549,686 B2
(45) Date of Patent: Apr. 15, 2003

(54) REFLECTIVE OPTICAL CIRCULATOR

(75) Inventors: Chen-Bin Huang, Hsinchu (TW); Wei-Jen Chou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/824,780

(22) Filed: Apr. 4, 2001

(65) Prior Publication Data

US 2002/0110305 A1 Aug. 15, 2002

(30) Foreign Application Priority Data

Feb. 9, 2001 (TW) ....................................... 90102839 A

(51) Int. Cl.[7] ................................................ G02B 6/00
(52) U.S. Cl. ........................ 385/11; 385/47; 359/494; 359/495; 359/496; 359/497; 359/499
(58) Field of Search ................................ 359/499, 484, 359/494, 495, 496, 497; 385/11, 47

(56) References Cited

U.S. PATENT DOCUMENTS

| 5,878,176 A | 3/1999 | Cheng |
| 5,921,039 A | 7/1999 | Sanders |
| 5,921,422 A | 7/1999 | Hunter et al. |
| 5,973,823 A | 10/1999 | Koops et al. |
| 6,002,512 A | 12/1999 | Bergmann et al. |
| 6,014,244 A | 1/2000 | Chang |
| 6,014,475 A | 1/2000 | Frisken |
| 6,049,426 A | 4/2000 | Xie et al. |
| 6,049,427 A | 4/2000 | Bettman |
| 6,064,522 A | * 5/2000 | Bergmann et al. .......... 359/280 |
| 6,088,491 A | 7/2000 | Sorin et al. |
| 6,097,869 A | 8/2000 | Chang et al. |
| 6,111,695 A | 8/2000 | Lee et al. |
| 6,154,581 A | * 11/2000 | Lu et al. ...................... 359/484 |
| 6,396,629 B1 | * 5/2002 | Cao ............................ 359/122 |

* cited by examiner

*Primary Examiner*—Audrey Chang
*Assistant Examiner*—Denise S. Allen
(74) *Attorney, Agent, or Firm*—Birch, Stewart, Kolasch & Birch, LLP

(57) ABSTRACT

This specification discloses a reflective optical circulator, which uses an optical reflective device to reflect an incident light beam from an optical port so that the reflected light beams further pass through all optical devices (i.e., all sorts of optical crystals) on the optical paths. With a proper reciprocal-non-reciprocal optical crystal combination, a particular linear polarization direction is generated to guide the reflected beams to the next optical port. The invention achieves the effect of repeatedly using crystals, lowering the number of crystals and the length of the optical circulator. On the other hand, all optical ports can be installed on the same side of the optical circulator, minimizing the device and making it easy to use.

12 Claims, 11 Drawing Sheets

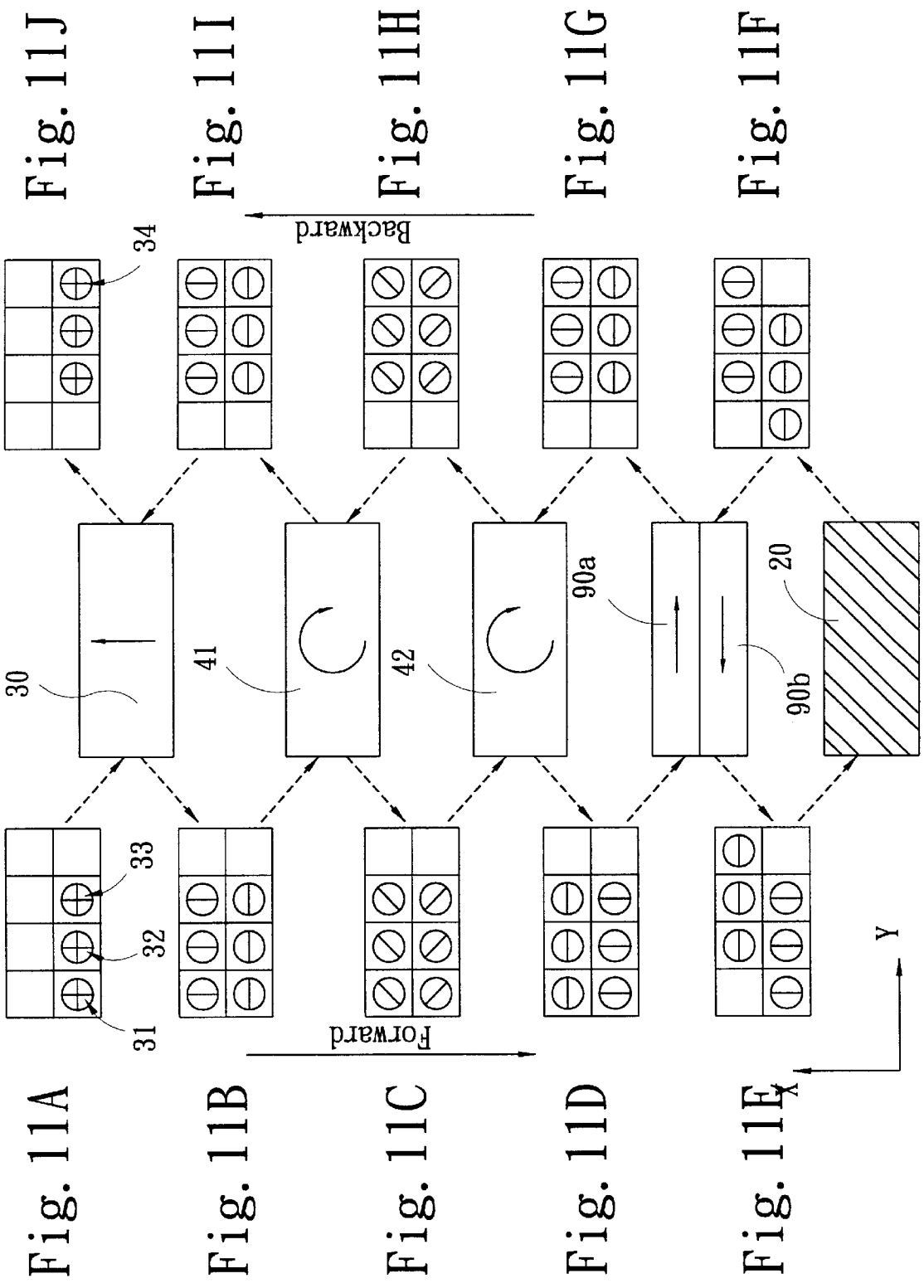

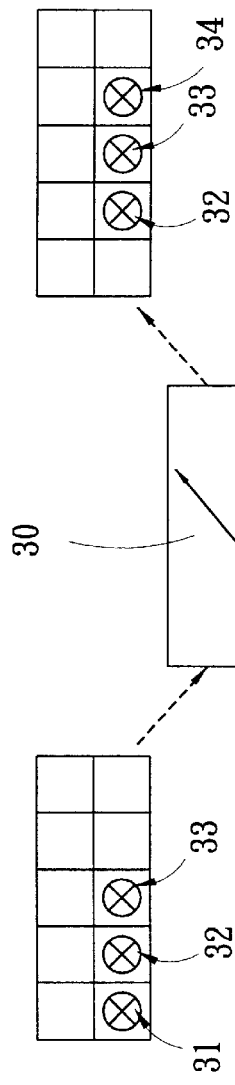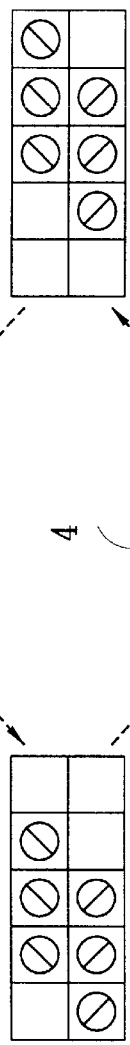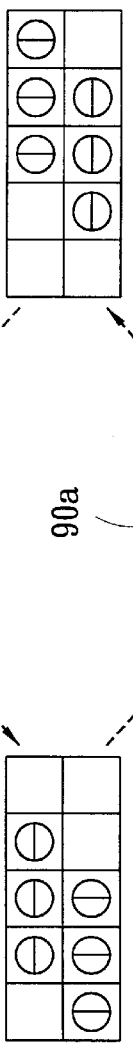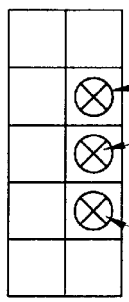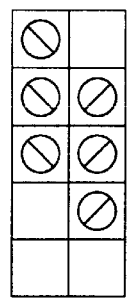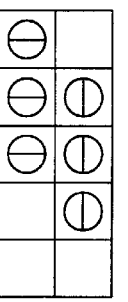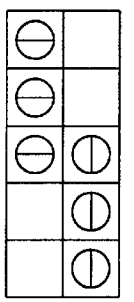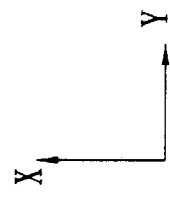

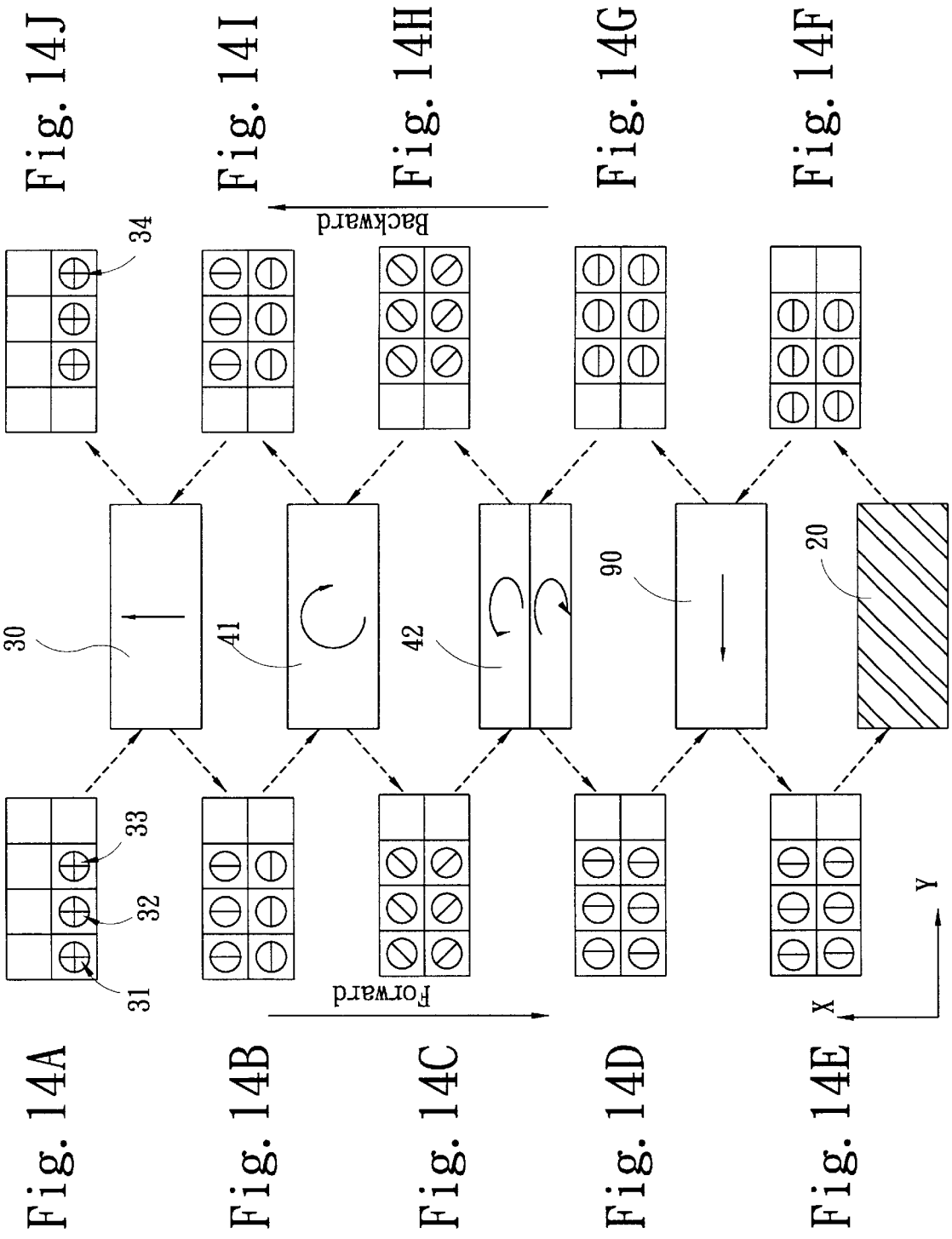

REFLECTIVE OPTICAL CIRCULATOR

BACKGROUND OF THE INVENTION

1. Field of Invention

The invention relates to an optical device and, in particular, to an optical circulator with several optical ports installed on the same side.

2. Related Art

Optical circulators are a kind of optical passive device with at least three optical ports. Light entering a first optical port is output from a second optical port and light entering the second optical port is output from a third optical port. When there are more than three ports, light entering the i'th optical port is output from the (i+1)'th optical port. Therefore, the optical path inside the optical circulator is irreversible.

Different optical ports of most known optical circulators are not situated on the same axis. Polarizing bear splinters (PBSs) have to be used, as proposed in U.S. Pat. No. 5,878,176. They do not only have higher prices, but also larger sizes. To decrease the volume of the products, most people design all optical pores on the same axis. There are several means to implement this. For example, U.S. Pat. No. 5,921,422 uses a thermally expanded core (TEC) fiber. U.S. Pat. Nos. 5,973,823 and 6,049,427 can both effectively minimize the product volume by aligning optical ports on the same axis. To lower product prices and to facilitate product assemblies, U.S. Pat. No. 5,973, 823 utilizes the relative angle between a multi-layer Faraday spin crystal and a birefringent crystal optical axis so as to abandon the need for half wave plates. U.S. Pat. No. 6,002,512 employs a latchable Faraday spin crystal to decrease the number of half wave plates. U.S. Pat. Nos. 5,921,039 and 6,049,426 do not only have all optical ports on the same axis, but also need two-core fiber collimator among the three optical ports. U.S. Pat. Nos. 6,014,244; 6,014,475; and 6,088,491 insert one of several lenses among crystals to change the optical path. Nevertheless, the above-cited references have a general feature: the i'th optical port and the (i+1)'th optical port are on different ends of the optical circulator. Therefore, their optical circulator products have a longer length and require more crystals. U.S. Pat. Nos. 6,097,869 and 6,111,695 both use one reflective mirror to make all optical ports on the same side. However, the optical ports of U.S. Pat. No. 6,097,869 are composes of TEC fibers. Each optical port requires an extra convergent lens. U.S. Pat. No. 6,111,695 totally needs three birefringent crystals to achieve the circulation function, resulting in more length and cost.

SUMMARY OF THE INVENTION

An objective of the invention is to decrease the number of crystals needed in an optical circulator and the length of the optical circulator, thus providing an optical circulator with a small volume.

Another objective of the invention is to provide an optical circulator with all its optical ports situated on the same side.

The invention uses an optical reflective device so that a light beam entering through an optical port is reflected and passes through all optical devices (i.e., all optical crystals) on its optical path so as to be guided to the next optical port. Through such a design, all crystals can be repeatedly used to reduce the number of crystals needed and the length of the optical circulator.

The invention uses a miniaturized fiber collimator as the I/O port of the circulator. Aside from reducing the area of crystals and shortening the crystal lengths, it further has feature of an extremely good expandability. The invention uses a non-reciprocal reflector, therefore all optical ports of the optical circulator can be installed on the same side, simultaneously achieving the circulation function and the optical designs of no polarization dependent loss (PDL) and no polarization mode dispersion (PMD).

The invention uses a proper reciprocal-non-reciprocal optical crystal combination to generate a specific linear polarization direction to selectively generate light beam walk-off, satisfying the irreversibility property of the optical path within the optical circulator.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIGS. 11A through 11J schematically show the beam polarization direction of the first crystal structure in FIG. 10;

FIGS. 12A through 12H schematically show the beam polarization direction of the second crystal structure in FIG. 10;

FIGS. 14A through 14J schematically show the beam polarization direction of the crystal structure in FIG. 13.

DETAILED DESCRIPTION OF THE INVENTION

Figure 1:
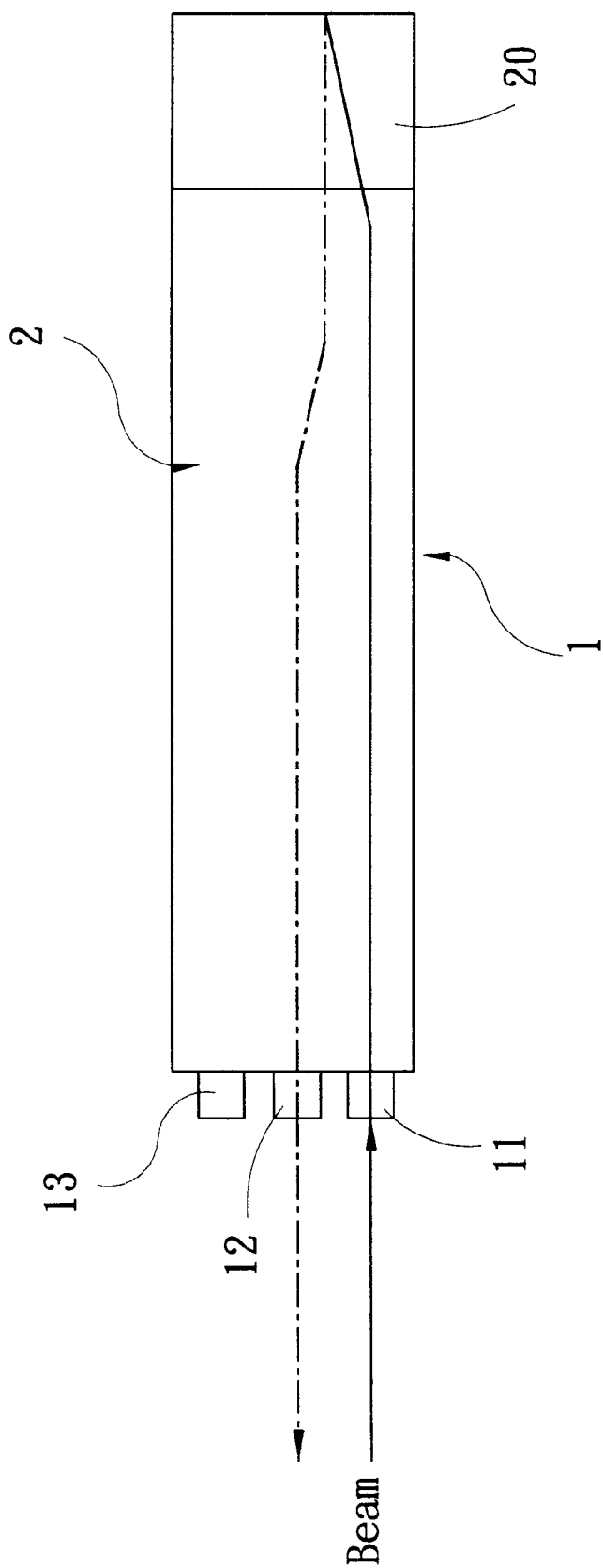
FIG. 1 schematically shows a basic structure of the optical circulator disclosed in the invention.

With reference to FIG. 1, the disclosed reflective optical circulator 1 includes at least three optical ports 11, 12, 13 located at the same side of the reflective circulator 1. The other side of the optical circulator 1 has an optical reflective device 20. Between the three optical ports 11, 12, 13 (hereinafter as port 1, port 2, port 3, respectively) and the optical reflective device 20 includes an optical crystal combination composed of crystals with several different optical properties. Due to the design of the optical reflective device 20, the light beam entering port 1 (11) reaches the optical reflective device 20 after passing through several crystals 2. It is reflected by the optical reflective device 20 back to pass through the crystals in reverse direction and is output from port 2 (12). Similarly, the light beam entering port 2 (12) is reflected by the optical reflective device 20 and output from port 3 (13). The behavior that a light beam entering the i'th optical port is output from the (i+1)'th optical port is the irreversibility property of the optical path within the light circulator.

Known optical circulators use at least one birefringent crystal to produce the walk-off effect. This effect separates an input light beam into linearly polarized light beams with different linear polarization directions and different optical paths. With a proper combination of reciprocal-non-reciprocal optical crystals, the input light beam can proceed according to a predetermined path, thus satisfying the irreversibility requirement for the optical path within the optical circulator. For birefringent crystals made of anisotropic crystals, incident light beams can be classified according to their polarizations into extraordinary rays (E-rays) and ordinary rays (O-rays), whose polarization directions are perpendicular to each other. For a linearly polarized light beam, the polarization directions of the above two rays differ by 90 degrees. The O-ray satisfies the Snell's Law and the wave propagation direction is parallel to the energy propagation direction. The propagation direction of an E-ray usually is not parallel to that of an O-ray, and its energy propagation direction differs according to the optical axis of the crystal (that is, the walk-off direction). This is called the walk-off phenomenon. Due to the walk-off phenomenon, linearly polarized light beams with different polarization directions have different optical path lengths. If no compensation or process is taken, the incident light beam may have the problem of signal distortion after leaving the optical circulator.

Therefore, the invention utilizes an optical reflective device 20 with an optical path compensation function to solve this problem. When two linearly polarized beams B1 and B2 with some optical path difference in between travel along different paths to the optical reflective device 20 and get reflected, the polarization mode dispersion (PMD) function of the optical reflective device 20 compensates for such an optical path difference. The disclosed optical reflective device 20 has basically two embodiments:

First embodiment: The basic principle is to use two optical devices with different reflection indices to form different optical paths. Because of the speed difference of two linearly polarized beams along paths with different reflection indices due to the walk-off effect, the total optical path become the same, thus achieving the PMD compensation function. The optical reflective device 20 in the first embodiment is basically a non-reciprocal polarization control crystal 21 (FIG. 2), such as a Faraday rotator or a quarter-wave plate. The beam incident surface 22 on the crystal 21 has an anti-reflection (AR) coating, and the other surface is a reflective surface 23. The reflective surface 23 can be a high-reflection (HR) coating of a high-reflection mirror.

Figure 2:
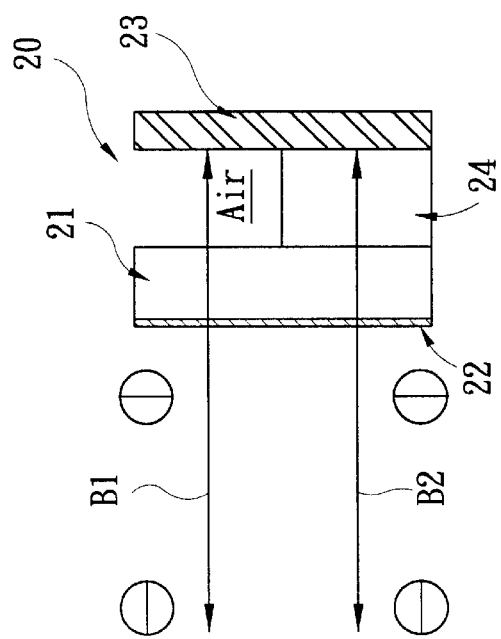
FIG. 2 is a first embodiment structure of the optical reflective device.

As shown in FIG. 2, a high-refraction optical crystal 24 is inserted between the crystal 21 and the reflection surface 23.

The optical crystal 24 is in the optical path of one of the two beams linearly polarized in different directions, particularly the one (B2) with a shorter optical path. Due to the insertion of the optical crystal 24, the linearly polarized beam B1 with a longer optical path travels through a section of air after passing through the crystal 21, reaches the reflection surface 23 and gets reflected into the crystal 21. Since the refraction index of the high-refraction optical crystal 24 is far greater than that of the air, the speed of the beam B2 with a shorter optical path in the optical crystal 24 is slower than that of the other beam B1 in the air. Thus, the beam B1 obtains a proper PMD compensation.

Figure 3:
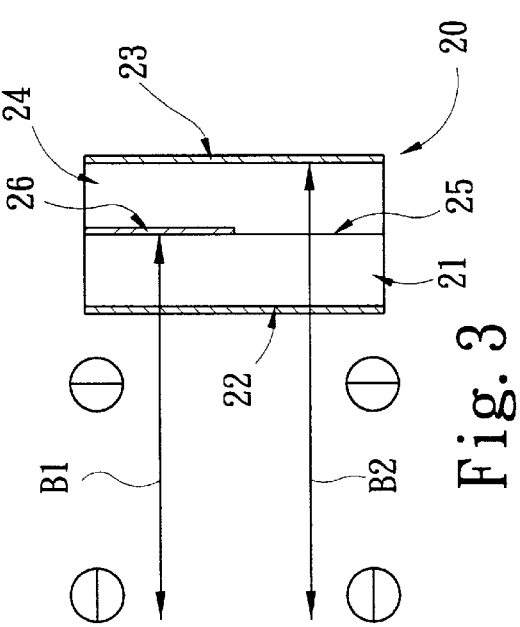
FIG. 3 is a second embodiment structure of the optical reflective device.

With further reference to FIG. 3, another structure of the invention is to form on the back surface of the crystal 21 (the surface opposite to the beam incident surface) one half AR 25 and the other half HR 26. The HR 26 is formed in the optical path of the beam B1 with a longer optical path and the AR 25 in the optical path of the beam B2 with a shorter optical path. Afterwards, an optical crystal 24 with a high-refraction index is attached onto the same surface. The other surface of the optical crystal 24 is formed with the above-mentioned reflective surface 23. In this embodiment, one can use glass as the material for the optical crystal 24, which becomes a mirror after attaching the reflective surface 23. This will greatly simplify the structure of FIG. 2. Basically, the high-refraction optical crystal 24 has a relatively higher refraction index to the air. Such an optical crystal can be made of silicon or optical glass.

Figure 4:
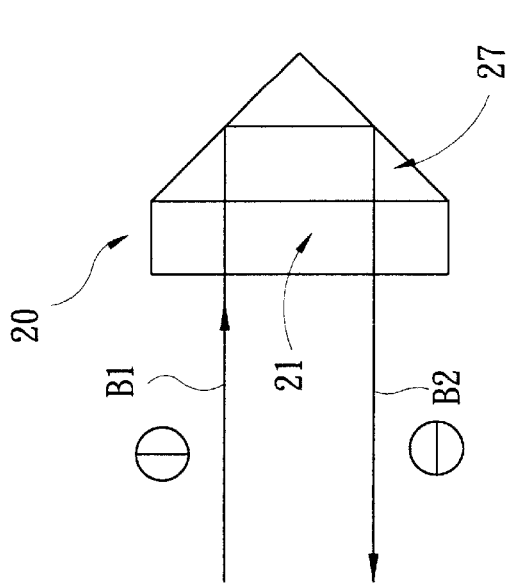
FIG. 4 is a third embodiment structure of the optical reflective device.
Figure 5:
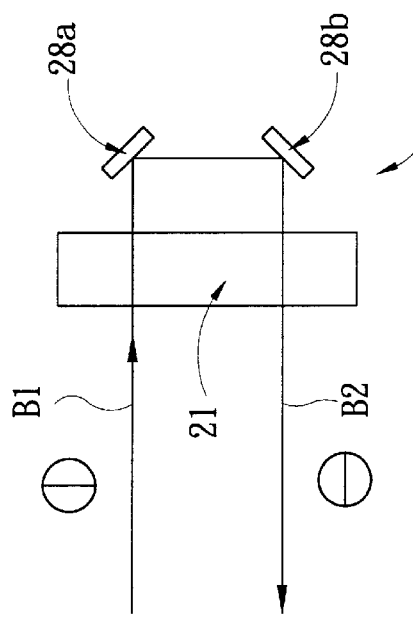
FIG. 5 is a fourth embodiment structure of the optical reflective device.

Second embodiment: It uses a reflective device that is equivalent to two 45-degree mirrors. As shown in FIG. 4, the optical reflective device 20 is composed of a non-reciprocal polarization control crystal 21 and a right-angle prism 27. In another example shown in FIG. 5, it is composed of a non-reciprocal polarization control crystal 21 and two 45-degree mirrors 28a, 28b. Therefore, the linearly polarized beam B1 returns along the optical path that the linearly polarized beam B2 enters the optical reflective device 20 after being reflected by the prism 27 or the two 45-degree mirrors 28a, 28b. Similarly, the linearly polarized beam B2 returns along the optical path that the linearly polarized beam B1 enters the optical reflective device 20 after being reflected by the prism 27 or the two 45-degree mirrors 28a, 28b. Therefore, the two walk-off linearly polarized beams B1, B2 have exactly the same optical path except in opposite directions, achieving the PMD compensation effect. In FIG. 4 and FIG. 5, the optics can be properly designed so that the polarization states of the two linearly polarized beams B1 and B2 that enter the optical reflective device 20 are orthogonal to each other. The optical reflective device 20 then does not need to have a non-reciprocal polarization control crystal 21 under this arrangement, thus further reducing the cost and offering the ease of fabrication.

One should also understand from FIGS. 2 through 5 that due to the action of the non-reciprocal polarization control crystal 21, the polarization directions of the linearly polarized beams B1, B2 entering the optical reflective device 20 are first rotated by 45 degrees after passing through the crystal 21 and by another 45 degrees after being reflected away from the optical reflective device 20 and passing through the crystal 21. So their linear polarization directions are indicated by the symbols in the drawings, being rotated by 90 degrees. That is, an E-ray becomes an O-ray.

The following description uses an optical circulator with four optical ports as an example to explain the complete structure of several embodiment reflective optical circulators disclosed herein. The structure of a first reflective optical circulator 1a is shown in FIG. 6.

Starting from the optical ports 31–34 along the optical axis are a birefringent crystal 30, a non-reciprocal colorization crystal 40, a first pair of birefringent crystals 50a, 50b, a second pair of birefringent crystals 60a, 60b, and a non-reciprocal optical reflective device 20. The birefringent crystal 30 has its walk-off direction in the +x direction for light propagating along the z-axis. It functions as a polarization splitter/combiner. One end of the optical path connects to optical ports 31, 32, 33, 34. The non-reciprocal polarization crystal 40 rotates a linearly polarized beam clockwise by 45 degrees. The first pair of birefringent crystals 50a, 50b has orthogonal walk-off directions and functions as a forward (The direction of the linearly polarized beam entering the reflective optical circulator 1a) displacer. The second pair of birefringent crystals 60a, 60b has orthogonal walk-off directions and functions as a backward (the direction of the linearly polarized beam leaving the reflective optical circulator 1a) displacer.

The reciprocal crystal refers to a crystal that the polarization direction of a beam does not change traveling back and forth once in the z-direction. However, for non-reciprocal crystals, the change in the polarization direction is additive. One usually uses a half-wave plate as the reciprocal crystal, and the non-reciprocal crystal can be a Faraday rotator or a quarter-wave plate.

Figure 6:
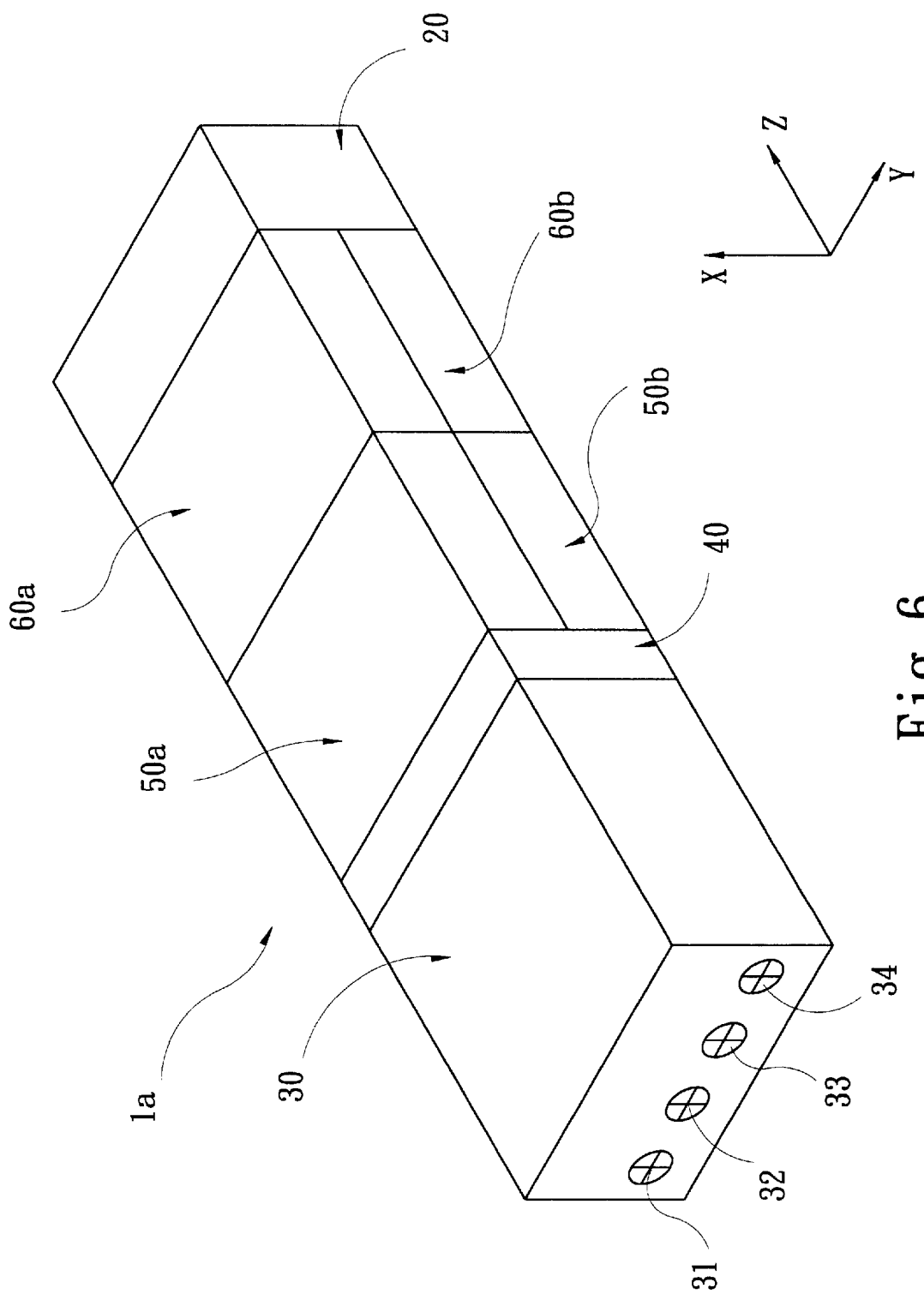
FIG. 6 shows the optical structure according to the first embodiment of the disclosed micro-reflective optical circulator.
Figure 7:
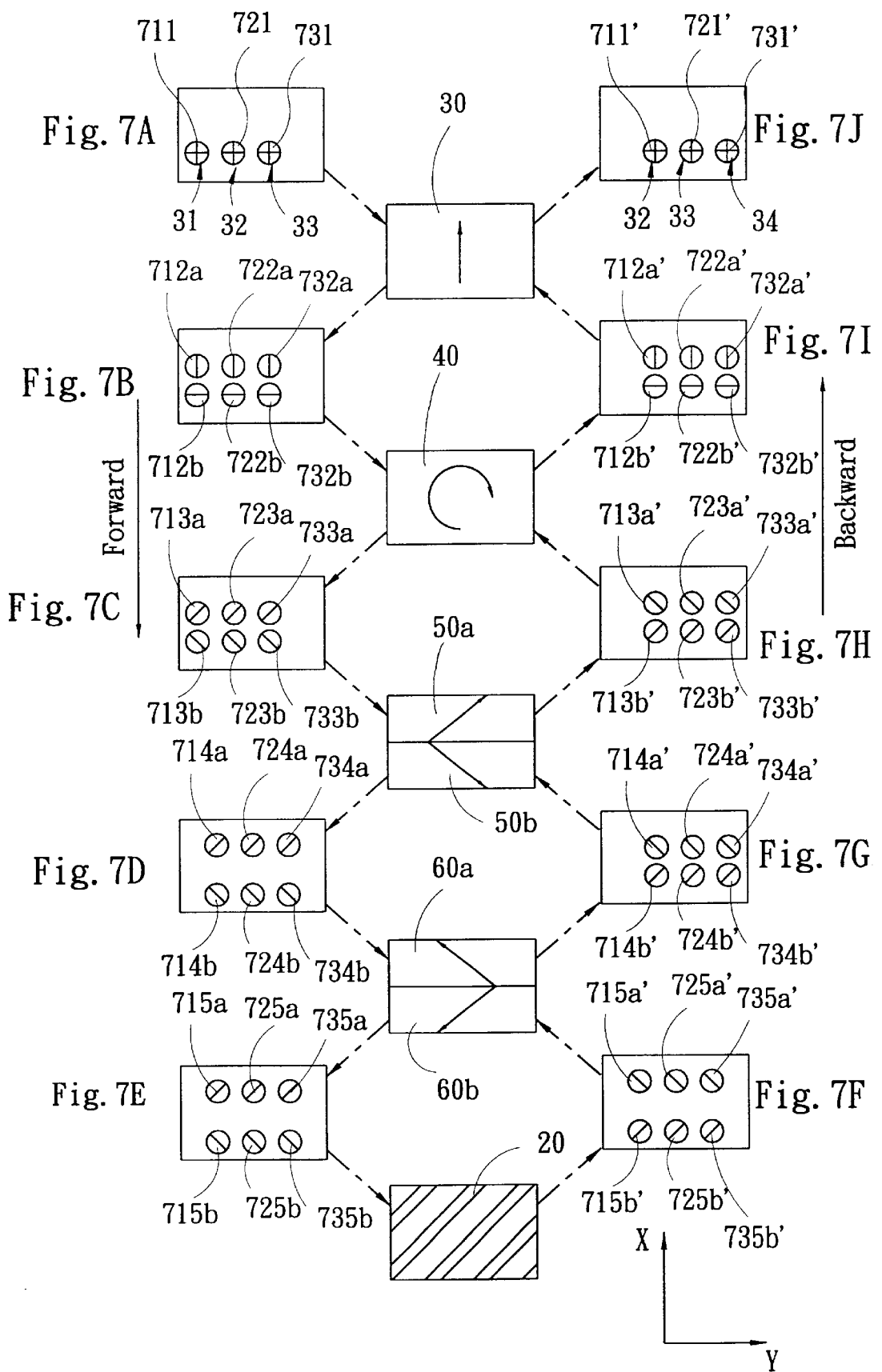
FIGS. 7A through 7J show detailed crystal orientations and optical polarizations along the paths in the propagation direction of FIG. 6.

FIGS. 7A through 7J indicate the polarization directions of a linearly polarized light beam passing through various crystals in the reflective optical circulator 1a in FIG. 6. In the drawings, we use circles and their diameters to indicate the polarization directions of the light beam. First, the linearly polarized light beams 711, 721, 731 enter the optical ports 31, 32, 33 along their forward directions (FIG. 7A). After passing through the birefringent crystal 30, they are separated into E-rays 712a, 722a, 732a and O-rays 712b, 722b, 732b due to the walk-off effect (the walk-off direction is the +x direction), as shown in FIG. 7B. After passing through the non-reciprocal polarization crystal 40, the E-rays and O-rays are rotated by 45 degrees in the same direction (clockwise) into linearly polarized beams 713a, 723a, 733a (−45 degrees with respect to the +x axis on the x-y plane) and 713b, 723b, 733b (−45 degrees with respect to the +y axis on the x-y plane), respectively, as shown in FIG. 7C. The beams further pass through the first pair of birefringent crystals 50a, 50b. Due to the walk-off effect (the walk-off directions are −45 degrees with respect to the +x axis and −45 degrees with respect to the +y axis, respectively, on the x-y plane), the beams are displaced toward the second optical port 32 along the optical axes of the birefringent crystals 50a, 50b, becoming the linearly polarized beams 714a, 724a, 734a and 714b, 724b, 734b, respectively (FIG. 7D). The walk-off directions of the second pair of birefringent crystals 60a, 60b are 135 degrees with respect to the +y axis and −135 degrees with respect to the +y axis, respectively, on the x-y plane. Therefore, the linearly polarized beams 714a, 724a, 734a and 714b, 724b, 734b directly pass through the second pair of birefringent crystals 60a, 60b and become beams 715a, 725a, 735a and 715b, 725b, 735b, respectively. Therefore, the beams enter the optical reflective device 20 without any polarization direction changed (FIG. 7E).

The linearly polarized light beams 715a, 725a, 735a and 715b, 725b, 735b are reflected by the optical reflective device 20 and become the linearly polarized beams 715a', 725a', 735a' and 715b', 725b', 735b', respectively (FIG. 7F). The polarization directions of the beams 715a', 725a', 735a' and 715b', 725b', 735b' are orthogonal to those of the beams 715a, 725a, 735a and 715b, 725b, 735b before being reflected off the optical reflective device 20, respectively. The reflected beams further pass through the second pair of birefringent crystals 60a, 60b. Due to the walk-off effect, the beams are displaced toward the second optical port 32, becoming the linearly polarized light beams 714a', 724a', 734a' and 714b', 724b', 734b', respectively (FIG. 7G). The beams pass through the first pair of birefringent crystals 50a, 50b with none of their polarization directions changed, becoming the linearly polarized light beams 713a', 723a', 733a' and 713b', 723b', 733b', respectively (FIG. 7H). Further passing through the non-reciprocal polarization crystal 40, the beams are rotated clockwise by 45 degrees and become the beams 712a', 722a', 732a' and 712b', 722b', 732b', respectively (FIG. 7I). Finally, the beams pass through the birefringent crystal 30 and combine together to form the linearly polarized beams 711', 721', 731', respectively, which then leave the optical circulator from the second, third and fourth optical ports 32, 33, 34 (FIG. 7J).

Figure 8:
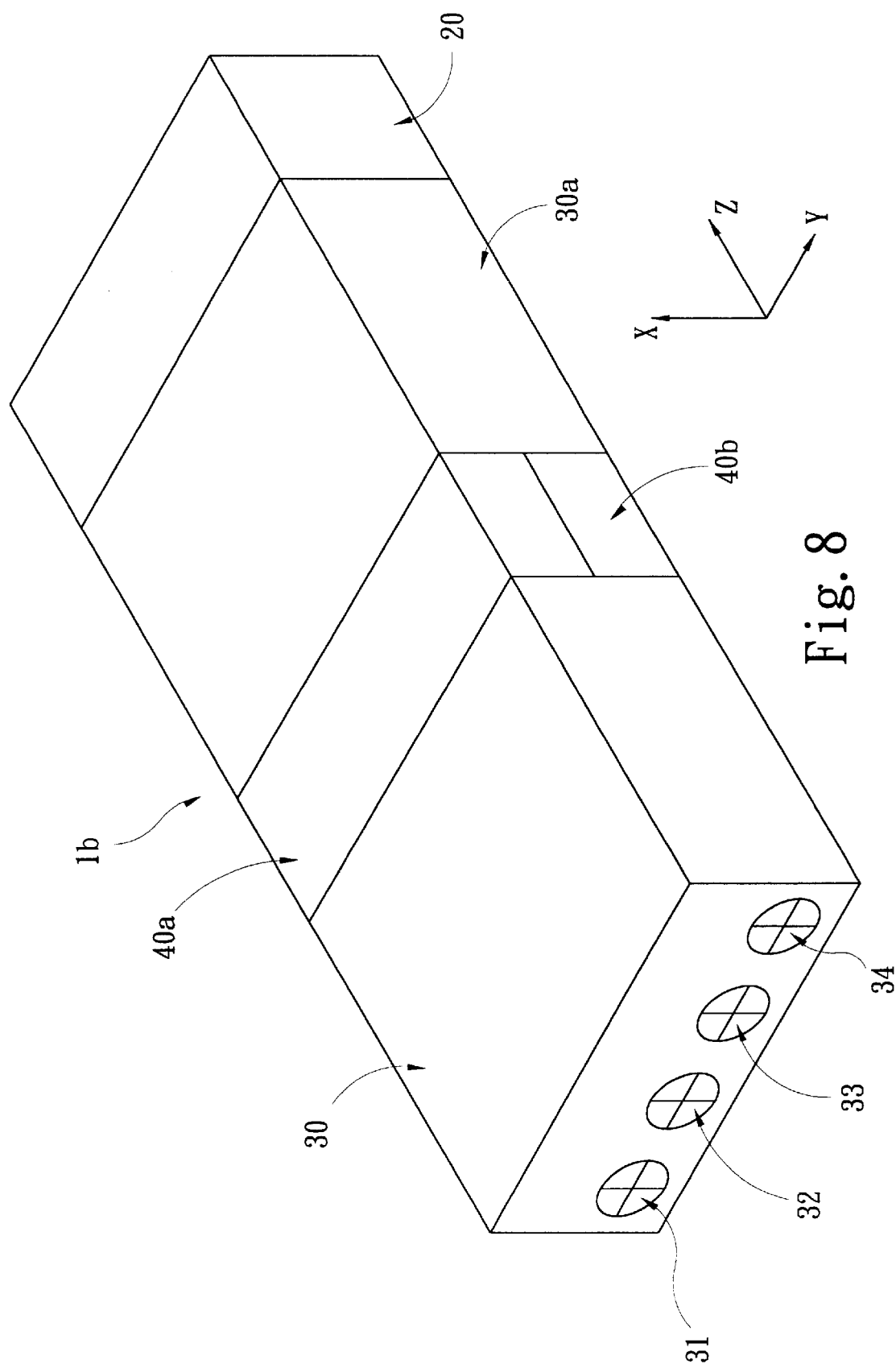
FIG. 8 shows the optical structure according to the second embodiment of the disclosed micro-reflective optical circulator.

FIG. 8 discloses the structure of a second micro-reflective optical circulator 1b, which includes a first birefringent crystal 30, a pair of non-reciprocal polarization crystals 40a, 40b, a second birefringent crystal 30a, and a non-reciprocal optical reflective device 20. The first birefringent crystal 30 has a c-axis orientation θ=φ=45° and functions as a polarization splitter/combiner in the 45° direction viewed on the x-y plane. One end of its optical path connects to the optical ports 31, 32, 33, 34. The pair of non-reciprocal polarization crystals 40a, 40b rotate the linearly polarized light beam by 45 degrees, but in opposite directions. The second birefringent crystal 30a has a walk-off direction θ=45°, φ=0° and functions as a displacer in the y direction.

Figure 9:
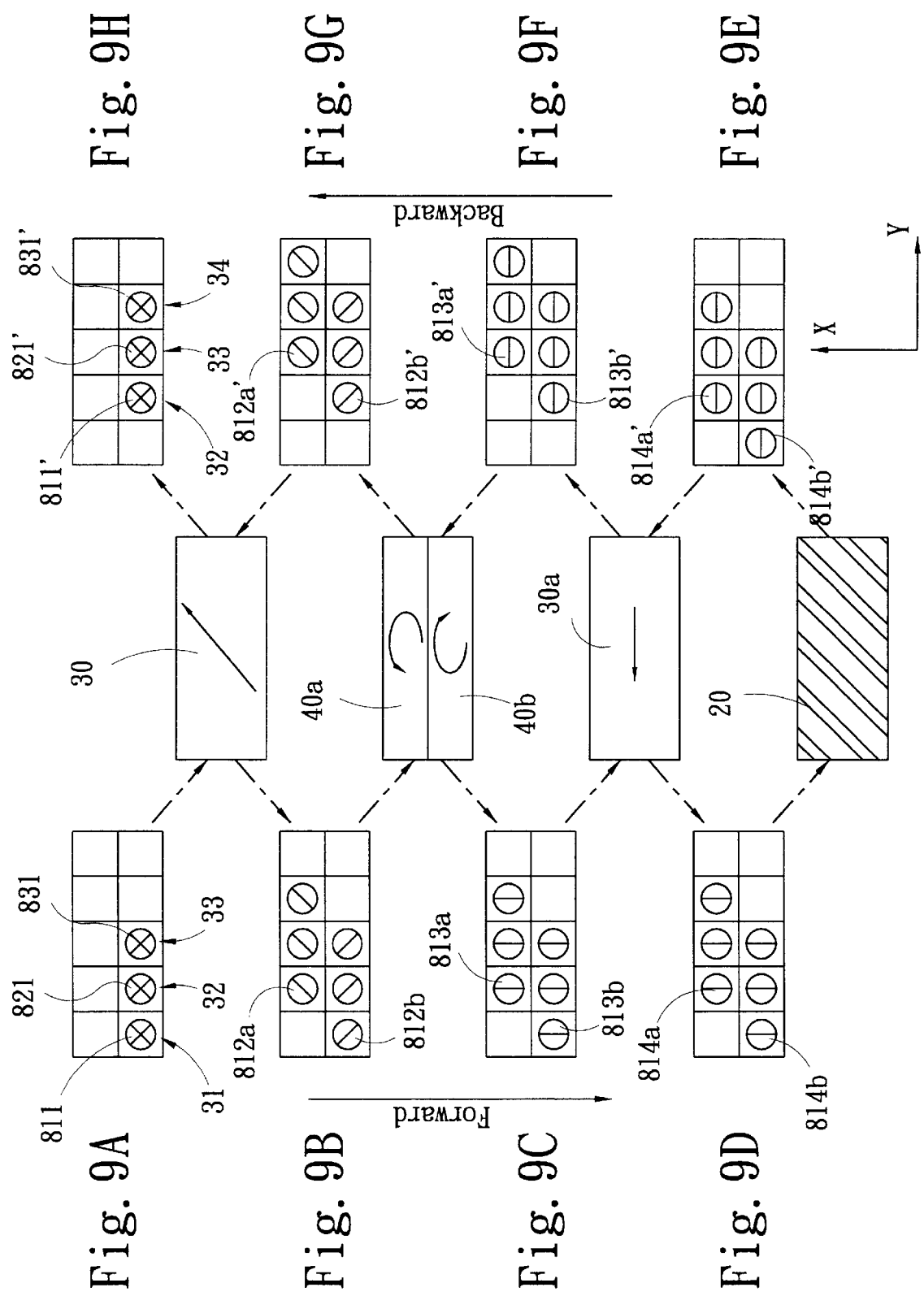
FIGS. 9A through 9H show detailed crystal orientations and optical polarizations along the paths in the propagation direction of FIG. 8.

FIGS. 9A through 9H indicate the polarization directions of a linearly polarized beam passing through various crystals in the reflective optical circulator 1b in FIG. 8. First, the linearly polarized light beams 811, 821, 831 enter the optical ports 31, 32, 33 along their forward directions (FIG. 9A). Taking the beam 811 entering the first optical port 31 as an example, after passing through the first birefringent crystal 30, it is separated into an E-ray 812a and an O-ray 812b due to the walk-off effect (FIG. 9B). The beams then pass through pair of non-reciprocal polarization crystals 40a, 40b. The crystal 40a rotates the beam counterclockwise by 45 degrees and the crystal 40b rotates the beam clockwise by 45 degrees. At the moment, the two polarized beams become the linearly polarized beams 813a and 813b with the same polarization direction (FIG. 9C).

The beams further pass through the second birefringent crystals 30a, both beams are O-rays relative to the second birefringent crystal 30a. Therefore, they do not experience the walk-off effect when passing through the second birefringent crystal 30a and become the linearly polarized beams 814a, 814b (FIG. 9D). After being reflected by the optical reflective device 20, the beams become the linearly polarized beams 814a',814b' with their polarization directions rotated by 90 degrees (FIG. 9E). When passing the second birefringent crystal 30a again, they experience the walk-off effect in the +y direction, becoming the linearly polarized beams 813a', 813b' (FIG. 9F). The beams 813a', 813b' further pass through the pair of non-reciprocal polarization crystals 40a, 40b and are rotated into the linearly polarized beams 812a', 812b with orthogonal polarization directions (FIG. 9G). Finally, they pass through the first birefringent crystal 30 and are combined into the beams 811', 821', 831', which are then leave the reflective optical circulator 1b from the optical ports 32, 33, 34 (FIG. 9H).

Figure 10:
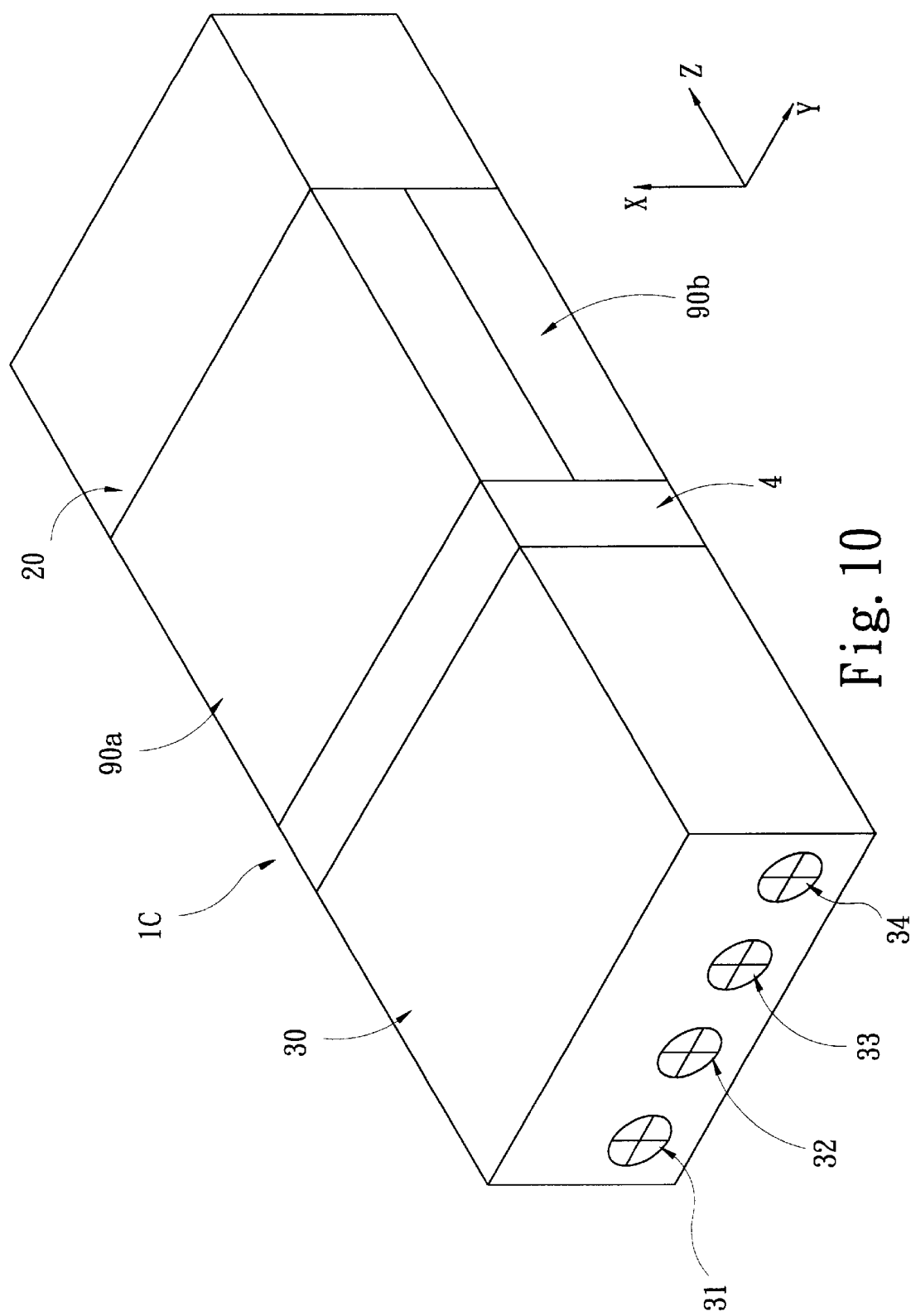
FIG. 10 shows the optical structure according to the third embodiment of the disclosed micro-reflective optical circulator.

FIG. 10 discloses the structure of a third micro-reflective optical circulator 1c, which includes a first birefringent crystal 30, a polarization rotation control crystal set 4, a pair of second birefringent crystals 90a, 90b, and a non-reciprocal optical reflective device 20. The first birefringent crystal 30 functions as a polarization splitter/combiner. One end of its optical path connects to the optical ports 31, 32, 33, 34. The pair of second birefringent crystals 90a, 90b has opposite walk-off directions to function as a displacer. The birefringent crystal 90a is a forward displacer to generate displacement for forward-traveling light beams. Its walk-off direction is the +y axis. The other birefringent crystal 90b functions as a backward displacer to generate displacement for backward-traveling light beams. Its walk-off direction is the −y axis in respective, to the forward propagating direction.

An embodiment of the polarization rotation control crystal set 4 is mainly composed of a first polarization rotation control crystal 41 and a second polarization rotation control crystal 42 (FIGS. 11A through 11J). The first polarization rotation control crystal 41 is a reciprocal crystal that rotates the polarization of a forward-traveling light beam (the direction the light beam enters the optical circulator) clockwise by 45 degrees. The second polarization rotation control crystal 42 is a non-reciprocal crystal that produces a clockwise polarization rotation by 45 degrees. The first birefringent crystal 30 has a walk-off direction in the +x direction. Its internal light beam polarization directions are shown in FIGS. 11A through 11J. The notation meanings are identical to the ones used before.

Another embodiment of the polarization rotation control crystal set 4 is a non-reciprocal crystal that produces a clockwise polarization rotation by 45 degrees. The first birefringent crystal 30 in FIG. 10 has a walk-off direction that is −45 degrees away from the +x axis on the x-y plane. Its internal light beam polarization directions are shown in FIGS. 12A through 12H. The notation meanings are identical to. the ones used before.

Figure 13:
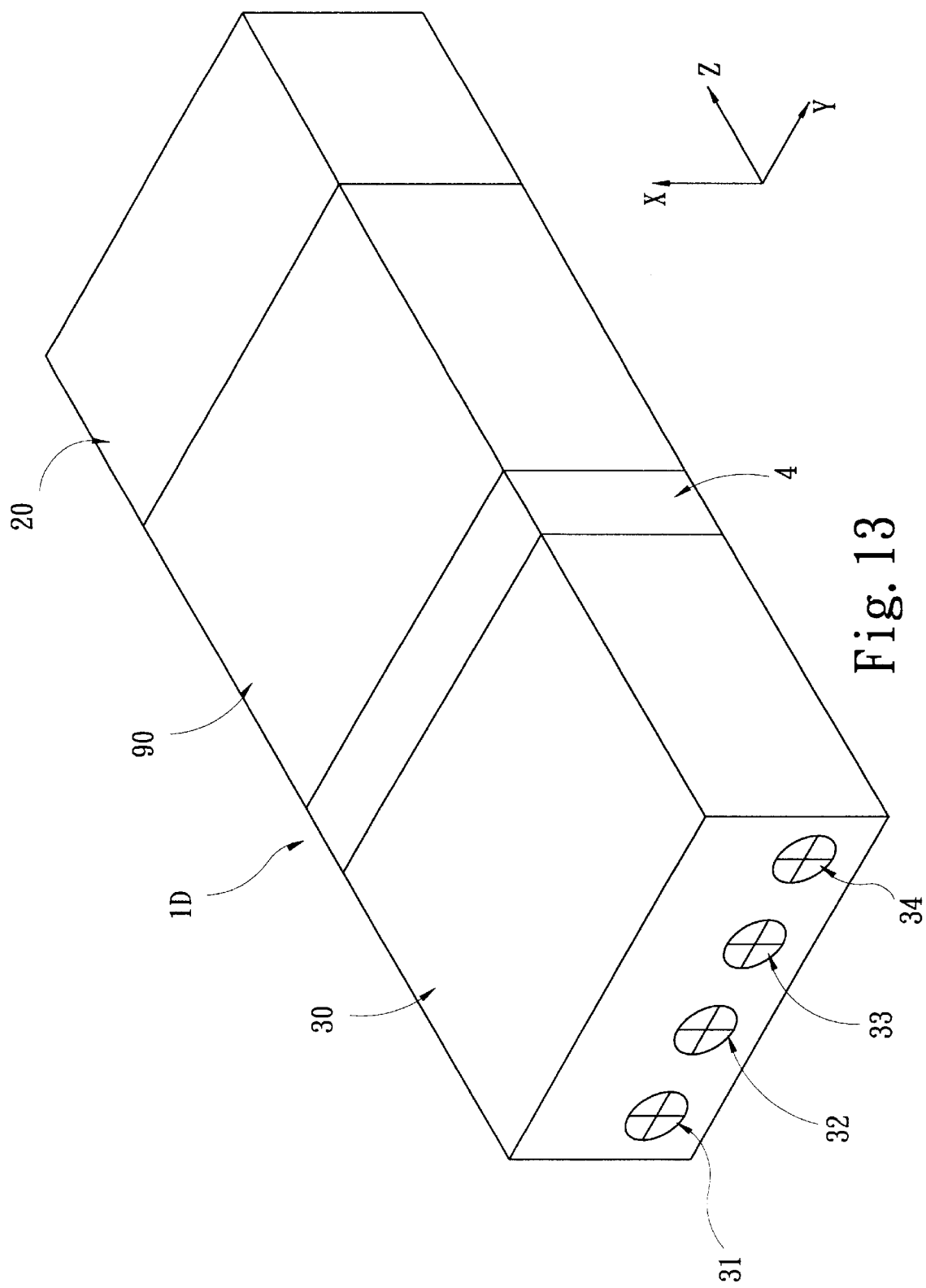
FIG. 13 shows the optical structure according to the fourth embodiment of the disclosed micro-reflective optical circulator.

FIG. 13 discloses the structure of a fourth micro-reflective optical circulator 1d, which includes a first birefringent crystal 30, a polarization rotation control crystal set 4, a second birefringent crystal 90, and a non-reciprocal optical reflective device 20. The first birefringent crystal 30 functions as a polarization splitter/combiner. One end of its optical path connects to the optical ports 31, 32, 33, 34. The second birefringent crystal 90 has a walk-off direction orthogonal to that of the first birefringent crystal 30. It functions as a displacer.

An embodiment of the polarization rotation control crystal set 4 is mainly composed of a first polarization rotation control crystal 41 and a set of second polarization rotation control crystals 42 (FIGS. 14A through 14J). The first polarization rotation control crystal 41 is a reciprocal crystal that rotates the polarization of a forward-traveling light beam clockwise by 45 degrees. The set of second polarization rotation control crystals 42 is a non-reciprocal crystal pair that produces clockwise and counterclockwise polarization rotations by 45 degrees, respectively. The first birefringent crystal 30 has a walk-off direction in the +x direction. Its internal light beam polarization directions are shown in FIGS. 14A through 14J. The notation meanings are identical to the ones used before.

Effects of the Invention

The invention uses a non-reciprocal optical reflective device so as to repeatedly use the crystals in an optical circulator. It can decrease the number, length, volume and cost of crystals in an optical circulator.

All optical ports are installed on the same said of the optical circulator, rendering great convenience in uses and extremely good expandability when more ports are needed.

The invention uses a proper design of birefringent crystal axes to use the same Faraday crystals, flipped by 180 degrees. This can produce the opposite polarization rotation direction to form a latched pair. The invention can use a single Faraday crystal to complete the polarization mode control. Therefore, expensive half-wave plates can be totally abandoned and the device angle errors are lowered to the minimum.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A reflective optical circulator comprising:
   a plurality of optical ports installed on a same side of the reflective optical circulator;
   a non-reciprocal optical reflective device installed on the other side of the reflective optical circulator to reflect linearly polarized light beams entering a first optical port and a second optical port; and
   an optical crystal combination unit installed among the optical ports and the non-reciprocal optical reflective device to separate the light beams entering the optical ports into two linearly polarized light beams with different optical paths and an optical path difference;
   wherein the two beams are further guided to and reflected from the non-reciprocal optical reflective device, the reflected beams are then recombined together and guided to the optical port adjacent to one of the ports that the light beam entered, to leave the reflective-optical circulator,
   wherein the non-reciprocal optical reflective device comprises:
   a non-reciprocal polarization control crystal;
   an anti-reflection coating on a surface opposite to a beam incidence surface of the non-reciprocal polarization control crystal and on the optical path of the linearly polarized beam with a shorter optical path;
   a high-reflection coating on a surface opposite to a beam incident surface of the non-reciprocal polarization control crystal and on the optical path of the linearly polarized beam with a longer optical path;
   a high-refraction optical crystal, whose refraction index is greater than that of air, installed on the anti-reflection coating and the high-reflection coating; and
   a reflective surface on the other side of the high-refraction optical crystal.

2. The reflective optical circulator of claim 1, wherein the high-refraction optical crystal is optical glass.

3. The reflective optical circulator of claim 1, wherein the reflective surface is a high-reflection coating.

4. The reflective optical circulator of claim 1, wherein the reflective surface is a high-reflection mirror.

5. A reflective optical circulator comprising:
   a plurality of optical ports installed on a same side of the reflective optical circulator;
   a non-reciprocal optical reflective device installed on the other side of the reflective optical circulator to reflect linearly polarized light beams entering a first optical port and a second optical port; and
   an optical crystal combination unit installed among the optical ports and the non-reciprocal optical reflective device to separate the light beams entering the optical ports into two linearly polarized light beams with different optical paths and an optical path difference;

wherein the two beams are further guided to and reflected from the non-reciprocal optical reflective device, the reflected beans are then recombined together and guided to the optical port adjacent to one of the ports that the light bean entered, to leave the reflective optical circulator, wherein the optical crystal combination unit comprises:
  a birefringent crystal with a walk-off direction in the x direction and one end of its optical path connecting to the optical ports, functioning as a polarization splitter/combiner;
  a non-reciprocal polarization crystal to rotate the polarization directions of linearly polarized light beams by 45 degrees;
  a first pair of birefringent crystals with their walk-off direction perpendicular to each other, functioning as a first pair of forward displacer; and
  a second pair of birefringent crystals with their walk-off direction perpendicular to each other, functioning as a second pair of backward displacer.

6. The reflective optical circulator of claim 3, wherein the on-reciprocal polarization crystal is a Faraday rotator.

7. The reflective optical circulator of claim 5, wherein the non-reciprocal polarization crystal is a quarter-wave plate.

8. A reflective optical circulator comprising:
  a plurality of optical ports installed on a same side of the reflective optical circulator;
  a non-reciprocal optical reflective device installed on the other side of the reflective optical circulator to reflect linearly polarized light beams entering a first optical port and a second optical port; and
  an optical crystal combination unit installed among the optical ports and the non-reciprocal optical reflective device to separate the light beams entering the optical ports into two linearly polarized light beams with different optical paths and an optical path difference;
wherein the two beams are further guided to and reflected from the non-reciprocal optical reflective device, the reflected beams are then recombined together and guided to the optical port adjacent to one of the ports that the light beam entered, to leave the reflective optical circulator,
wherein the optical crystal combination unit comprises:
  a first birefringent crystal with one end of its optical path connecting to the optical ports, functioning as a polarization splitter/combiner;
  a set of polarization rotation control crystals; and
  a pair of second birefringent crystals with opposite walk-off directions, functioning as displacers, one of them being a forward displacer and the other a backward displacer.

9. The reflective optical circulator of claim 8, wherein the first birefringent crystal has a walk-off direction in the x direction, the set of polarization rotation control crystals comprising a first polarization rotation control crystal and a second polarization rotation control crystal, the first polarization rotation control crystal being a reciprocal crystal that rotates the polarization of a forward light by 45 degrees and the second polarization rotation control crystal being a non-reciprocal crystal that rotates the polarization of a light beam in the same direction of the reciprocal crystal by 45 degrees.

10. The reflective optical circulator of claim 8, wherein the first birefringent crystal has a walk-off direction 45 degree from the +x axis and the polarization rotation control crystal is a non-reciprocal crystal that rotates the polarization of a light beam clockwise by 45 degrees.

11. A reflective optical circulator comprising:
  a plurality of optical ports installed on a same side of the reflective optical circulator;
  a non-reciprocal optical reflective device installed on the other side of the reflective optical circulator to reflect linearly polarized light beams entering a first optical port and a second optical port; and
  an optical crystal combination unit installed among the optical ports and the non-reciprocal optical reflective device to separate the light beams entering the optical ports into two linearly polarized light beams with different optical paths and an optical path difference;
wherein the two beams are further guided to and reflected from the non-reciprocal optical reflective device, the reflected beams are then recombined together and guided to the optical port adjacent to one of the ports that the light beam entered, to leave the reflective optical circulator,
wherein the optical crystal combination unit comprises:
  a first birefringent crystal with one end of its optical path connecting to the optical ports, functioning as a polarization splitter/combiner;
  a set of polarization rotation control crystals; and
  a second birefringent crystal whose walk-off direction is perpendicular to the polarization splitter/combiner, functioning as a displacer.

12. The reflective optical circulator of claim 11, wherein the first birefringent crystal has a walk-off direction in the x direction, the set of polarization rotation control crystals comprising a first polarization rotation control crystal and a second set of polarization rotation control crystals, the first polarization rotation control crystal being a reciprocal crystal that rotates the polarization of a forward light beam by 45 degrees and the second set of polarization rotation control crystals being non-reciprocal crystals, one above the other, that rotate the polarization of a light beam by 45 degrees in the same and opposite directions in respect to the rotating direction of the reciprocal crystal, respectively.

* * * * *